May 25, 1926.
J. F. O'CONNOR
1,585,678
FRICTION SHOCK ABSORBING MECHANISM
Filed July 9, 1923   2 Sheets-Sheet 2
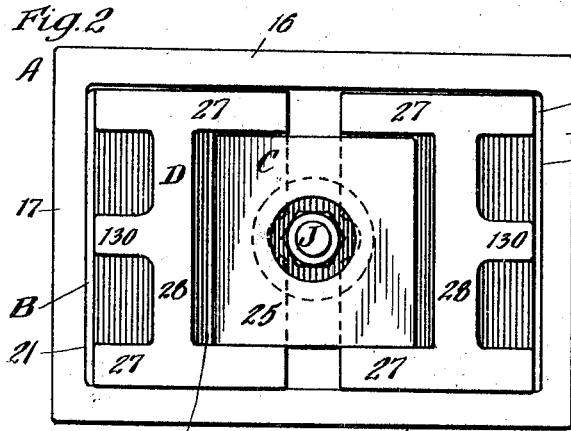
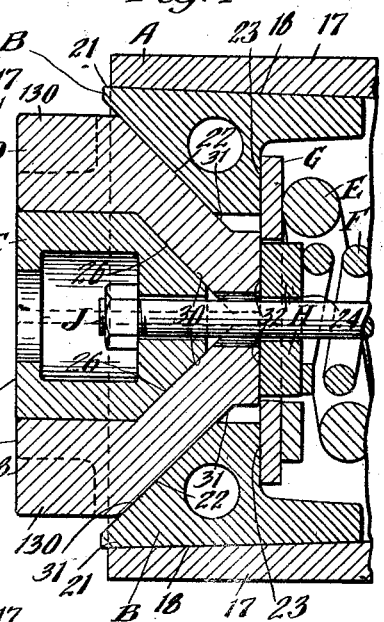
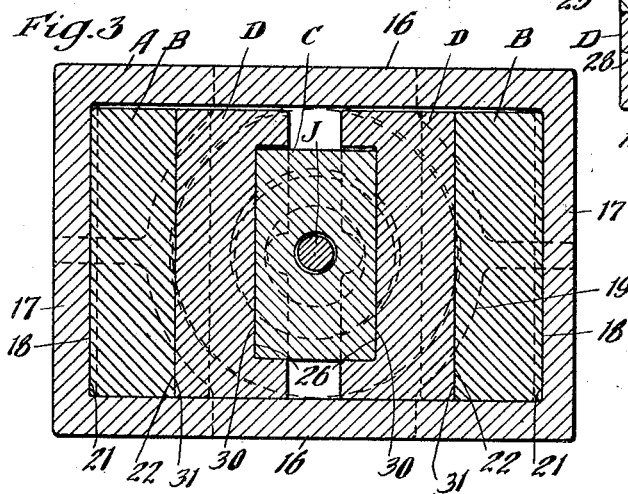
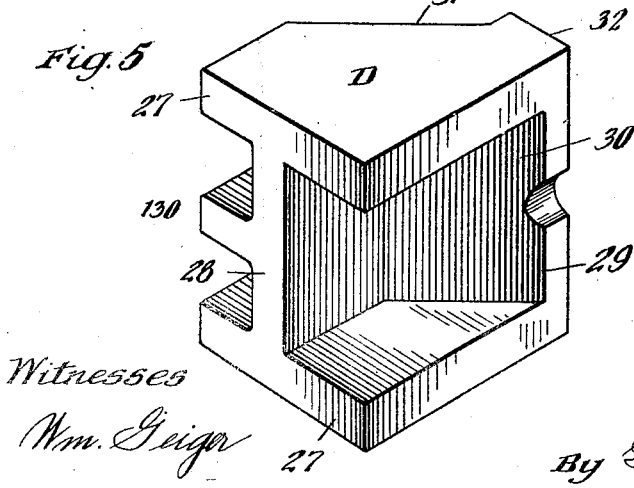
Witnesses
Wm. Geiger
Inventor
John F. O'Connor
By George J. Haight
Atty Patented May 25, 1926.

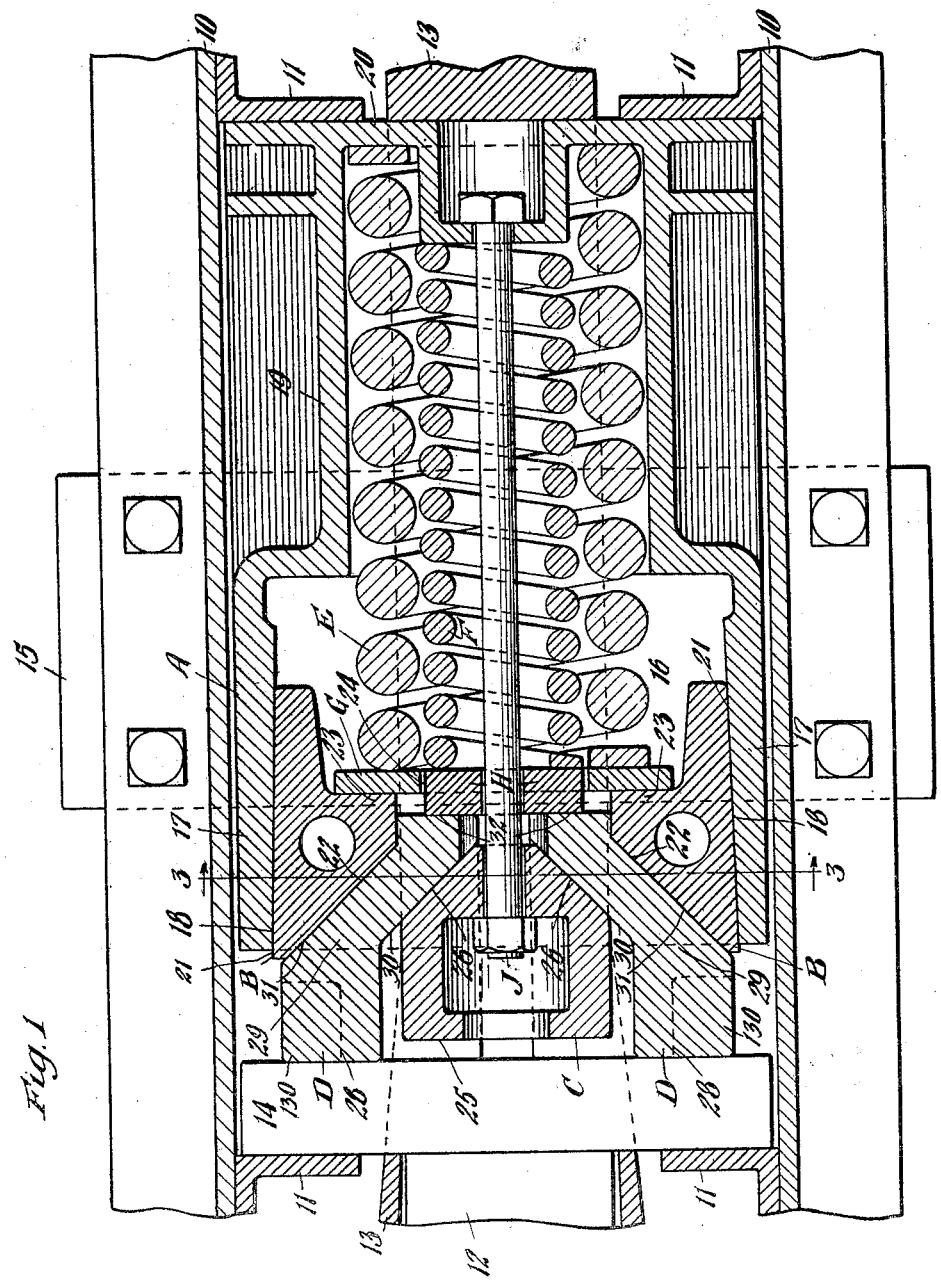

1,585,678

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 9, 1923. Serial No. 650,209.

This invention relates to improvements in friction shock-absorbing mechanisms.

One object of the invention is to provide a friction shock absorbing mechanism especially adapted for railway draft riggings wherein are obtained high capacity, and an easy graduated action with a preliminary movement for a predetermined portion of the stroke with much greater resistance during the balance of the stroke.

A more specific object of the invention is to provide a mechanism of the character indicated having an easy preliminary action for cushioning the more numerous relatively small shocks with an ultimate higher capacity, thereby adapting the mechanism especially for passenger car equipment.

The invention furthermore consists in the improvements, parts and devices, and in the novel combinations of the parts and devices herein shown, described and made the subject of claims.

In the drawings forming a part of this specification, Figure 1 is a horizontal, longitudinal, sectional view of a portion of a railway draft rigging showing my improvements in connection therewith. Figure 2 is a front end elevation of the friction shock absorbing mechanism proper. Figure 3 is a vertical, transverse, sectional view of the shock absorbing mechanism proper corresponding to the line 3—3 of Figure 1. Figure 4 is a broken, horizontal, sectional view, similar to Figure 1, but illustrating the position assumed by the parts after an initial portion of the compression stroke. And Figure 5 is a detail perspective of one of the pressure-transmitting auxiliary wedge elements.

In said drawings, 10—10 denote the usual draft sills of a car underframe to the inner faces of which are secured front and rear stop lugs 11—11, of usual construction. A portion of a drawbar is indicated at 12, the same being operatively associated with the shock absorbing mechanism proper by a hooded cast yoke 13 within which is disposed said mechanism and a main front follower 14. The yoke and parts therewithin are supported in operative position by a detachable saddle plate 15.

The improved shock absorbing mechanism proper comprises, broadly, a combined friction shell and spring cage casting A; a pair of friction-shoes B—B; a central wedge member or block C; a pair of pressure-transmitting auxiliary wedge members D—D; a spring resistance comprising an outer coil E and an inner coil F; two spring followers G and H; and a retainer bolt J.

The casting A is of substantially rectangular form at its front or outer end having top and bottom walls 16—16 and side walls 17—17. A friction shell of rectangular form is thus formed, the side walls 17 having their inner faces providing longitudinally extending flat friction surfaces 18 which are converged inwardly of the shell. At the inner end of the shell proper, the casting is made of reduced section to provide a spring cage 19 and in which the two spring coils are housed and maintained in center. At its inner end the casting A has an integral transversely extending wall 20 laterally extended and suitably reinforced to adapt it to act as the rear follower of the mechanism.

The two opposed friction-shoes B are of like construction and each is preferably in the form of a cored casting having an outer flat friction surface 21 cooperable with the corresponding adjacent shell friction surface 18, and an inclined wedge face 22, the two wedge faces converging inwardly of the shell and extending at an angle of preferably 45° with respect to the axis of the mechanism. Transverse shoulders are formed at the inner ends of the wedge sections of the shoes as indicated at 23 and against which bears the spring follower G. The spring follower G is engaged by the front end of the outer heavy coil E only of the spring resistance and is centrally apertured as indicated at 24 to loosely receive therewithin the thicker second spring follower H which engages the front end of the inner coil F, only.

The central wedge member or block C is in the form of a cored casting having a front transverse bearing face 25 and a pair of wedge faces 26—26 converged inwardly of the shell and extending, preferably, at the same angle as the shoe wedge faces 22. In the normal or full release position of the parts, the bearing face 25 of the wedge block C is spaced from the front follower 14 a predetermined distance depending upon the desired amount of easy preliminary action. In actual practice, this space will approximate one-half inch.

The two pressure-transmitting auxiliary wedge members D are of like construction and each comprises top and bottom heavy flanges sections 27—27 (see Figure 5); a longitudinally extending vertical flange section 28 and an inclined heavy sections 29, the latter providing an inner wedge face 30 and an outer wedge face 31 co-operable with the wedge faces 26 and 22, respectively. At its inner end, each member D is formed with a flat transversely extending bearing face 32 which engages the front face of the spring follower H at a point spaced forwardly from the spring follower G a distance at least equal to the distance between the front end of the wedge block C and the follower 14. Each member D is suitably braced by a strengthening rib 130 on its outer side, as best shown in Figure 5. In the normal position of the parts, it will be noted that there is considerable clearance between the side faces of the wedge block C and the opposed faces of the auxiliary wedge members D. It will also be observed that the wedge block C is suitably held in proper central position by engagement between the top and bottom flanges 27 of the two auxiliary wedge members D.

The retainer bolt J is anchored at its rear end within a suitable hollow boss formed integral with the casting A and at its front end in the recess provided in the wedge C, it being understood that the spring follower H is suitably apertured to accommodate the shank of the bolt. The bolt J serves to maintain the parts in assembled relation and also to maintain the spring coils under initial compression.

The operation of the mechanism is as follows, assuming a buffing action, particular reference being had to Figures 1 and 4. As the drawbar 12 and follower 14 move toward the right, as viewed in Figure 1, the two auxiliary pressure-transmitting wedge members D will be moved longitudinally, simultaneously therewith. During this action, the shoes B will remain substantially stationary due to the resistance afforded by the heavy outer coil spring E, the normal amount of static friction between said shoes and the surfaces of the shell, and also by reason of the taper of the shell surfaces 18 which further resists tendency of the shoes B to move inwardly of the shell. As the two wedge members D are moved longitudinally, they are also compelled to move laterally inwardly toward each other, sliding between the sets of wedge faces 22 and 26 of the shoes and wedge member C, respectively. This movement of the members D is resisted, not only by the friction obtaining between the wedge faces referred to, but also by the inner coil spring F, acting through the follower H. This action continues until the parts assume the position shown in Figure 4, that is, when the outer ends of the members D are flush with the outer bearing face 25 of the wedge block C. At this time, the wedge members D and wedge block C are interlocked and in tight engagement with each other, as clearly shown in Figure 4, and during the remainder of the compression stroke, act as a solid unit, thus making the wedge faces 31 of the members D the effective wedge faces in exerting lateral pressure against the shoes B as the latter are forced inwardly of the shell. As the shoes are forced inwardly of the shell, it is evident that a slight differential action will take place, the shoes B approaching each other laterally, which movement is readily accommodated, inasmuch as there is a space provided for this purpose between the shoes and the inner ends 32 of the wedge members D, as clearly shown by Figure 4. In release, the initial action is caused by the spring F which bears directly upon the auxiliary wedge members D and serves to loosen the latter with respect to the shoes, thus permitting a collapse of the entire friction unit and then permitting both spring coils to expand and restore all of the parts to normal position. As will be evident, compensation for wear will be automatically provided for by the shoes B gradually working outward under the expansion of the outer spring coil E.

By properly proportioning the parts and the space initially left between the wedge block C and the follower 14, I am enabled to obtain an easy, relatively light capacity resistance for any desired initial portion of the compression stroke which is then followed by a much heavier frictional resistance to absorb the heavier blows. With this construction, the mechanism is especially useful on passenger equipment where the greater majority of the shocks are relatively small.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction shell having interior opposed friction surfaces; of a spring resistance; opposed friction-shoes co-operable with said shell surfaces; central wedge-acting means free from direct actuating pressure during the initial portion of a compression stroke but arranged to receive the actuating pressure directly after a predetermined preliminary action; and pressure-transmitting auxiliary wedge means, operable between said first named wedge means and the shoes and adapted for limited movement with respect to said first named wedge means during said initial portion of the compression stroke.

2. In a friction shock absorbing mechanism, the combination with a friction shell having interior opposed friction surfaces converged inwardly of the shell; of a spring resistance; opposed friction-shoes slidable on the friction surfaces of the shell; central wedge-acting means normally free from direct actuating pressure but adapted to directly receive the actuating pressure after a predetermined compression of the mechanism; and pressure-transmitting auxiliary wedge means interposed between said first named wedge means and the shoes and adapted for limited movement with respect to said first named wedge means during the initial portion of a compression stroke, the relative movement of said central and auxiliary wedge means being terminated upon the central wedge coming under direct actuating pressure.

3. In a friction shock absorbing mechanism, the combination with a friction shell having interior, opposed friction surfaces; of a spring resistance comprising an inner coil and an outer coil; opposed friction shoes cooperable with the friction surfaces of the shell; pressure transmitting wedge means cooperating with said shoes; and central wedge acting means free from direct actuating pressure during the initial part of a compression stroke, and thereafter adapted to receive the actuating pressure simultaneously with the pressure transmitting wedge means, said pressure transmitting wedge means being yieldingly resisted at their inner end by said inner spring coil and said shoes being directly resisted by said outer spring coil.

4. In a friction shock absorbing mechanism, the combination with a friction shell having interior, inwardly converging friction surfaces; of a spring resistance; friction shoes coacting with said shell surfaces; a lateral pressure transmitting unit including a wedge block initially free from the direct actuating force and pressure-transmitting members interposed between the wedge block and shoes, said pressure-transmitting members being adapted to directly receive the actuating force, said unit being contractable during the compression stroke; and follower means co-operating with said unit adapted to engage said wedge block after a predetermined compression of the mechanism and limit the contraction of said unit.

5. In a friction shock absorbing mechanism, the combination with a friction shell having inwardly converging friction surfaces on the interior thereof; of a spring resistance; and a friction generating system cooperable with the shell friction surfaces, said system including a contractible wedge pressure transmitting means; a plurality of wedge friction shoes coacting with said wedge pressure transmitting means and said shell friction surfaces; and an auxiliary wedge coacting with said contractible wedge and adapted to limit the contraction thereof after a predetermined preliminary action of the mechanism.

6. In a friction shock absorbing mechanism, the combination with a friction shell having inwardly converging friction surfaces on the interior thereof; of a plurality of friction wedge shoes co-operable with said shell friction surfaces; a spring resistance; an outer contractible wedge coacting with said friction shoes; and an inner wedge co-operable with said outer wedge, said outer wedge being provided with abutment faces adapted to limit the contraction thereof by engagement with said inner wedge.

7. In a friction shock absorbing mechanism, the combination with a front follower; of a friction shell having inwardly converging friction surfaces on the interior thereof; a plurality of friction wedge shoes co-operable with said shell friction surfaces; a spring resistance; an outer contractible wedge coacting with said front follower and engaging said shoes; an inner wedge within said contractible wedge and co-operable therewith, said inner wedge having the outer end normally spaced from said follower and adapted to be engaged thereby after a predetermined action of the mechanism and moved inwardly of the shell in unison with said outer wedge.

8. In a friction shock absorbing mechanism, the combination with a front follower; of a friction shell having inwardly converging friction surfaces on the interior thereof; of a plurality of friction wedge shoes co-operable with said shell friction surfaces; a spring resistance; an outer contractible wedge coacting with said front follower and engaging said shoes; an inner wedge within said contractible wedge and co-operable therewith, said inner wedge having its outer end normally spaced from said follower and adapted to be engaged thereby after a predetermined action of the mechanism and moved inwardly of the shell in unison with said outer wedge; coacting abutment means on said outer and inner wedges; and means for limiting the outward movement of said inner wedge.

9. In a friction shock absorbing mechanism, the combination with a friction shell having inwardly converging friction surfaces on the interior thereof; of a plurality of friction wedge shoes co-acting with said shell friction surfaces; a contractible outer wedge coacting with said shoes; an inner wedge coacting with said contractible wedge and acting to limit the contraction of the latter; and spring resistance means opposing inward movement of said contractible wedge and shoes.

10. In a friction shock absorbing mechanism, the combination with a friction shell having interior inwardly converged friction surfaces; of a spring resistance; wedge friction shoes co-operable with the surfaces of said shell; a direct pressure-receiving, contractible and expansible wedge co-operable with said shoes; and an auxiliary wedge co-operable with said first named wedge and initially free from actuating pressure, but arranged to receive the actuating pressure directly after a predetermined preliminary action.

11. In a friction shock absorbing mechanism, the combination with a column-acting friction member having longitudinally extending friction surfaces; of a spring resistance; wedge friction shoes co-operable with the friction surfaces of said member; a sectional wedge co-operable with said shoes and adapted to directly receive the actuating pressure; and auxiliary wedge means co-operable with said sectional wedge, said auxiliary wedge means being free from direct actuating pressure during the initial portion of the compression stroke and thereafter adapted to receive the actuating pressure simultaneously with the sectional wedge, the latter and the auxiliary wedge means then acting as a single unit.

In witness that I claim the foregoing I have hereunto subscribed my name this 6th day of July, 1923.

JOHN F. O'CONNOR.